(12) United States Patent
Darby

(10) Patent No.: US 10,589,827 B2
(45) Date of Patent: Mar. 17, 2020

(54) STRUCTURE FOR STABILIZING A BARREL ON A PONTOON VESSEL

(71) Applicant: Cruisin' Tikis, LLC, Pompano Beach, FL (US)

(72) Inventor: Gregory B. Darby, Pompano Beach, FL (US)

(73) Assignee: Cruisin' Tikis, LLC, Pompano Beach, FL (US)

( * ) Notice: Subject to any disclaimer, the term of this patent is extended or adjusted under 35 U.S.C. 154(b) by 0 days.

(21) Appl. No.: 16/249,711

(22) Filed: Jan. 16, 2019

(65) Prior Publication Data

US 2019/0217932 A1 Jul. 18, 2019

Related U.S. Application Data

(60) Provisional application No. 62/617,965, filed on Jan. 16, 2018.

(51) Int. Cl.
*B63B 43/04* (2006.01)
*B63B 1/12* (2006.01)

(52) U.S. Cl.
CPC ............ *B63B 43/04* (2013.01); *B63B 1/125* (2013.01)

(58) Field of Classification Search
CPC ................. B63B 43/04; B63B 1/125
See application file for complete search history.

(56) References Cited

U.S. PATENT DOCUMENTS

| 5,605,243 A * | 2/1997 | Jolly | B65D 88/34 220/216 |
| 7,240,634 B1 * | 7/2007 | Hoge, Jr. | B63B 7/082 114/345 |
| 7,497,182 B2 * | 3/2009 | Grove | B60F 3/0038 114/123 |
| 2002/0129756 A1 * | 9/2002 | Myers | B63B 1/121 114/354 |
| 2008/0236467 A1 * | 10/2008 | Wyman | B63B 7/02 114/61.1 |
| 2016/0286767 A1 * | 10/2016 | Newell | A01G 31/02 |

* cited by examiner

*Primary Examiner* — Stephen P Avila
(74) *Attorney, Agent, or Firm* — Howard M. Gitten; Lewis, Brisbois, Bisgaard & Smith LLP

(57) ABSTRACT

A structure for stabilizing a barrel on a pontoon vessel includes a deck structure. First And second hull frame members are affixed to the deck structure and extend therealong. In spaced relationship to each other. A first and second conduit extends along a respective hull frame member; the first conduit being spaced from the second conduit by a distance to receive a portion of a barrel therebetween and each conduit contacting the barrel above a barrel central line. A strap having a first end anchored near the first conduit, and tracing a path from the anchor beneath, and in contact with, the barrel disposed between the first conduit in the second conduit, along the second conduit, and returning to the first conduit by tracing a path from the second conduit to the first conduit beneath and in contact with the barrel.

14 Claims, 3 Drawing Sheets

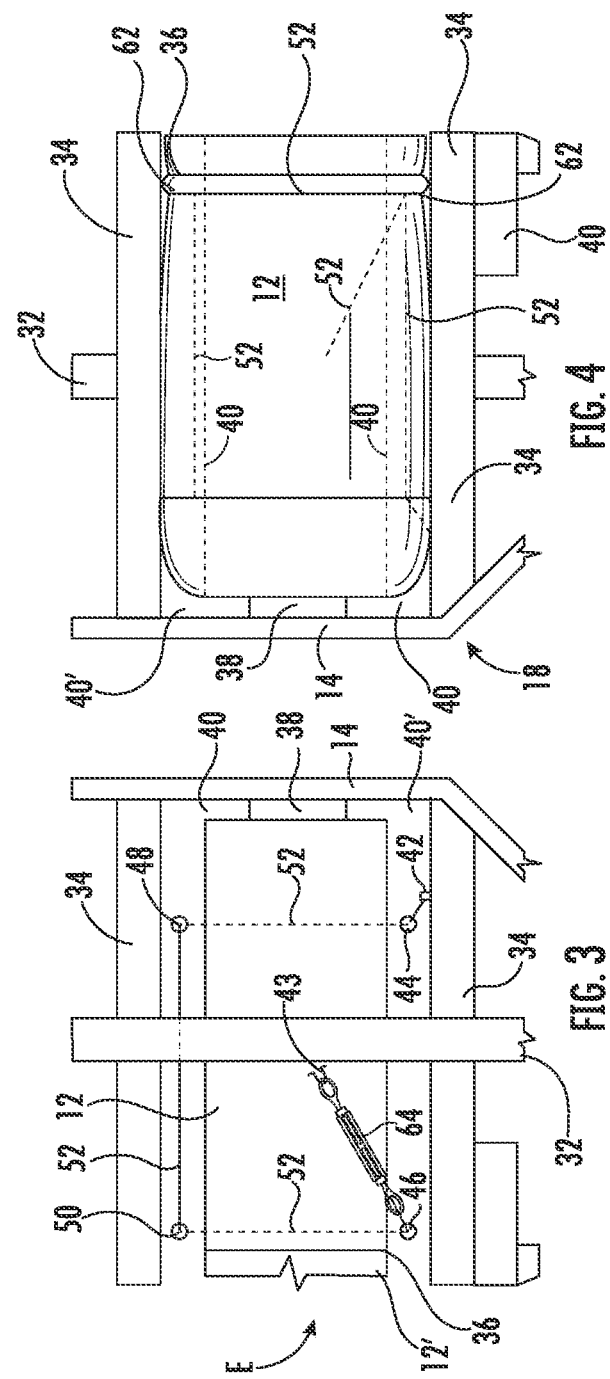

STRUCTURE FOR STABILIZING A BARREL ON A PONTOON VESSEL

CROSS-REFERENCES TO RELATED APPLICATION

This application claims the benefit of U.S. Provisional Patent Application Ser. No. 62/617,695, filed Jan. 16, 2018, the entireties of which are incorporated by reference herein as if fully set forth.

BACKGROUND OF THE INVENTION

The present invention is directed to a structure for stabilizing a barrel on a pontoon vessel, and more particularly, to a structure for maintaining the barrel fixed to the deck structure to which is attached.

It is known in the art to provide buoyant barrels to support floating structures. Pontoon barrel structures have been satisfactory, particularly for docks, lake diving platforms and small watercraft. However, over time, the load from the deck on the barrels flattens the barrels; deforming the barrels and causing the barrels to move and slide laterally relative to the deck. As a result, drag would be increased for flat deck pontoon type watercraft as the barrels are no longer in alignment with the direction of movement, and the platform would become less stable as the underlying barrel shifted position relative to the deck and the load thereon. Instability, while may be desirable to increase play value for a lakeside platform, becomes undesirable on a vessel where movement at speed turns instability into an unsettling, if not dangerous, ride.

Accordingly, a structure for stabilizing a pontoon vessel substructure over time to reduce drag and resulting fuel inefficiencies while increasing ride stability and enjoyment is desired.

SUMMARY OF THE INVENTION

A structure for stabilizing a barrel on a pontoon vessel includes a deck structure. A first hull frame member is affixed to the deck structure and extends therealong. A second hull frame member is affixed to the deck structure and extends therealong spaced from the first hull frame member. A first conduit extends along the first hull frame member. A second conduit extends along the second hull frame member; the first conduit being spaced from the second conduit by a distance to receive a portion of a barrel therebetween and each conduit contacting the barrel above a barrel central line. A strap having a first end anchored near the first conduit, and tracing a path from the anchor beneath, and in contact with, the barrel disposed between the first conduit in the second conduit, along the second conduit, and returning to the first conduit by tracing a path from the second conduit to the first conduit beneath and in contact with the barrel. The strap having a second end anchored near the first conduit.

In another embodiment of the invention, the hull frame members form lanes beneath the deck, and a plurality of barrels are each disposed within a lane. A stop may be disposed within each lane in a travel direction of the vessel between the deck structure and at least one barrel disposed within a respective lane. The barrel may be provided with an indent, the strap engaging the indent along the path.

BRIEF DESCRIPTION OF THE DRAWINGS

The present disclosure will be better understood by reading the written description with reference to the accompanying drawings, in which like reference numerals denote similar structure and refer to like elements throughout in which:

FIG. 3 is an enlarged view of the structure shown in the circle of FIG. 2;

FIG. 4 is a bottom plan view of the structure of FIG. 3; and

FIG. 5 is a sectional view taken along line 5-5 of FIG. 2.

DETAILED DESCRIPTION OF THE PREFERRED EMBODIMENTS

Figure 1:
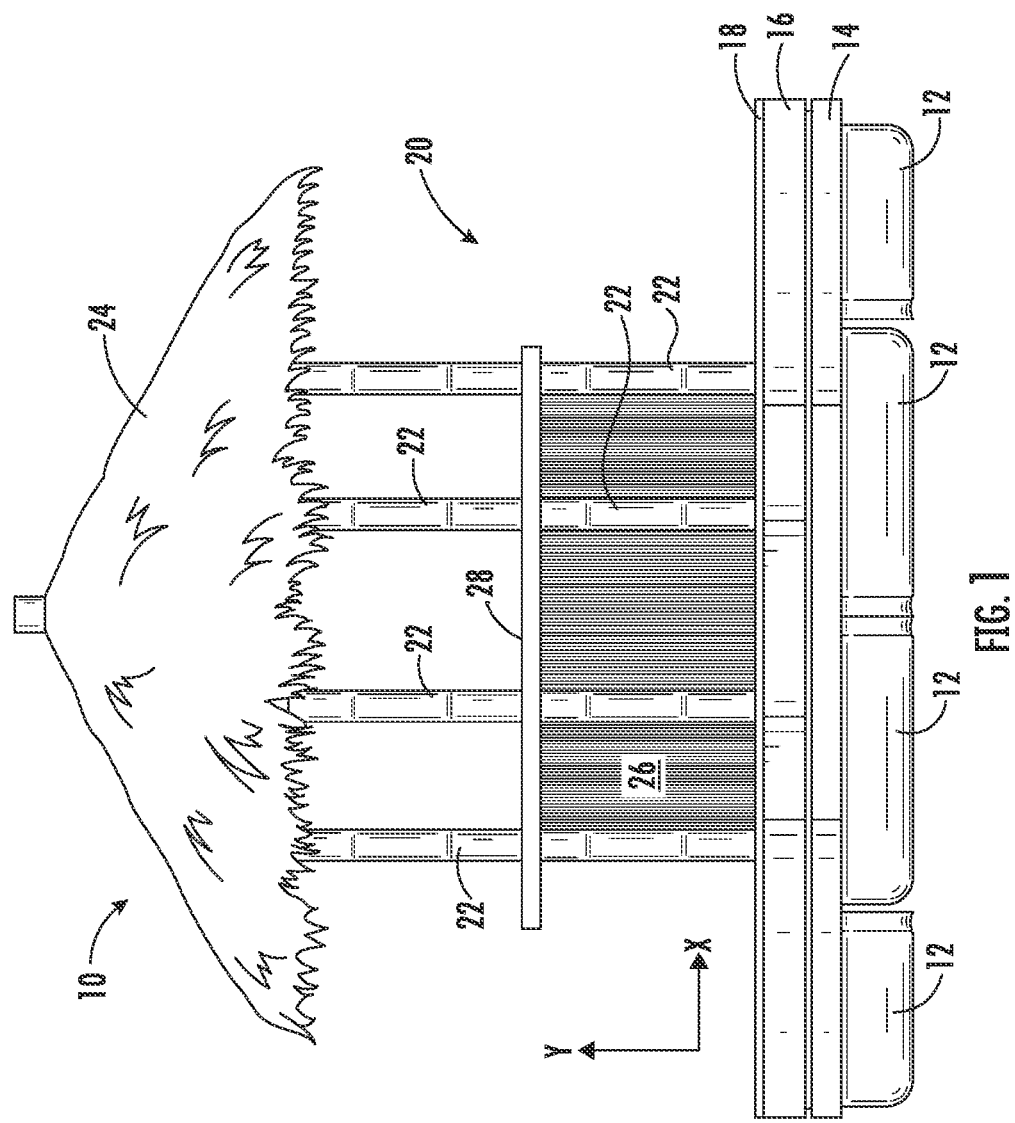
FIG. 1 is a side plan view of a vessel constructed with the stabilizing structure of the invention.

Reference is now made to FIGS. 1-4 in which a pontoon vessel 10 including a structure 15 for stabilizing pontoon barrels 12 relative to the deck 18 is provided. Vessel 10 includes a plurality of pontoon barrels 12. Pontoon barrels 12 support a deck 18 which rests upon a deck structure including a frame 14 providing a boundary for barrels 12 and a frame 16 upon which deck 18 is disposed. In a preferred nonlimiting example, frame 14, frame 16 and deck 18 define an octagon periphery.

A superstructure 20 disposed on deck 18 includes a plurality of support beams 22 extending from deck 18 in a Y direction. Support beams 22 support a thatched roof 24 at a top end, and a wall 26 at a bottom end (that end closest to deck 18) which in turns supports a shelf 28 to provide an overall Tike hut appearance to vessel 10.

Figure 2:
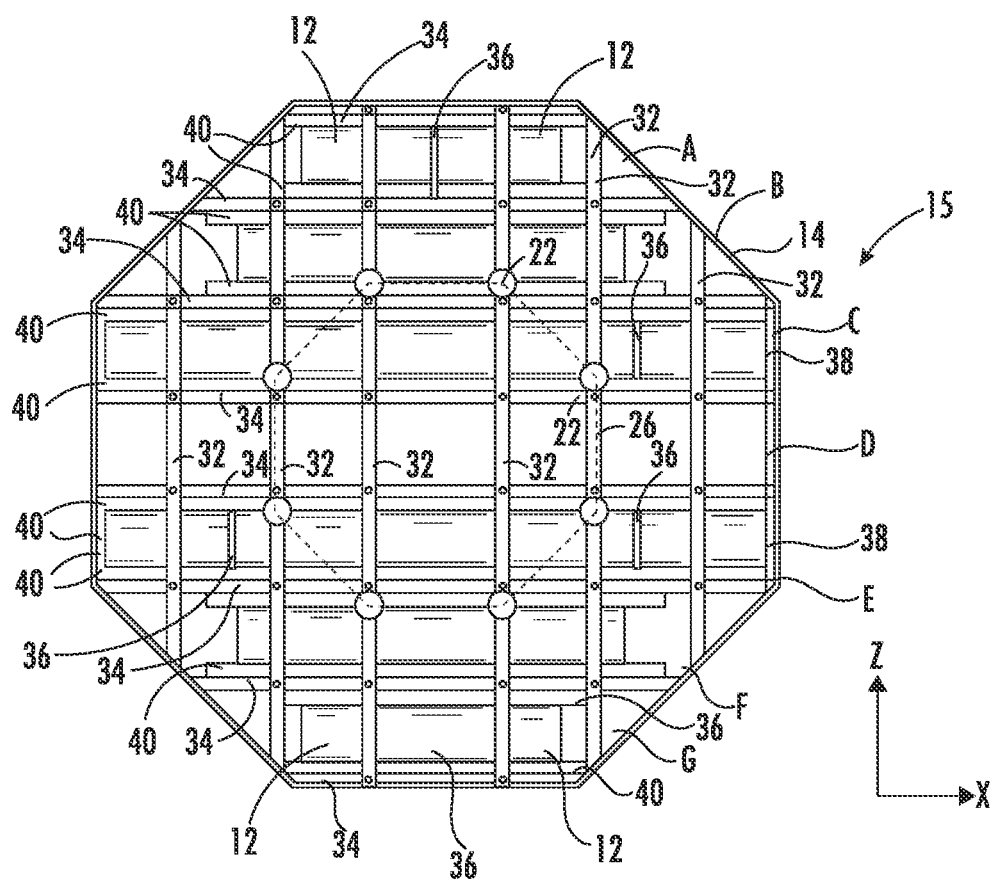
FIG. 2 is a top plan view of the structure for stabilizing a barrel constructed in accordance with the invention.

As seen more particularly in FIG. 2 structure 15 includes frame 14 forming the perimeter of structure 15. Frame 14 may be made of wood, metal, or such other structure sufficiently rigid to maintain its shape and enable other substructure to be attached thereto. In the exemplary embodiment, frame 14 has the shape of an octagon, but any other flotation stable perimeter may be utilized. A plurality of hull frame members 34 are attached at spaced intervals to frame 14. Adjacent hull frame members 14 are substantially parallel to each other to form lanes A-G therebetween. A plurality of barrels 12 are disposed within respective lanes A-G.

In a preferred nonlimiting embodiment an odd number of lanes are utilized so that the central lane, lane D in the present invention, is left clear to provide water passage and reduce drag when the vessel is in motion while the remainder of the lanes provide balanced buoyancy about lane D. Lane D corresponds to the lane in which the motor may be attached. A center lane of an odd number of lanes also keeps drag experienced by pontoon vessel 10 substantially symmetrical about the center lane reducing "pull" to either side aiding maneuverability and stability. Hull frame members 34 may be made of metal, wood, plastics or the like, but in a preferred nonlimiting embodiment hull frame members 34 are formed of wood to provide sufficient structural integrity with a minimal amount of weight.

A plurality of deck boards 32 are disposed within perimeter 14 at spaced intervals in a direction substantially orthogonal (the Z direction) to hull frame members 34. Hull frame members 34 are affixed to deck boards 32. Deck boards 32 are attached to an undersurface (facing away from any superstructure) of deck 18, and may be attached to either one of perimeter frame 14 or perimeter frame 16. This crosshatch structure provides stability in two directions to the deck structure. Deck boards 32 may also be formed of metal, plastic, or the like, but in a preferred non-limiting embodiment are formed of wood. In a preferred embodiment deck port 32 supports deck 18, but it would be within the scope of the invention for a top surface of deck board 32 to form a portion of deck 18.

Reference is now made to FIGS. 3-5 in which a description of this structure for attaching barrel 12 within stabilizing structure 15 is described with more particularity. The description is given in connection with a single lane, lane E, but is exemplary of each of the lanes, the primary difference being the number and/or length of barrels 12 extending along each lane.

A respective conduit 40 is disposed on, and attached to a respective hull frame member 34 within lane E. In this way, a first conduit 40 is disposed in spaced relation, across a gap H of lane E, from a second conduit 40'. In an alternative embodiment, each conduit 40, 40' may be affixed to deck boards 32. In a preferred nonlimiting embodiment each conduit is a pipe formed from PVC.

A first hole 44 and a second hole 46 are formed at a spaced interval from each other along a first conduit 40. The distance between hole 44 and hole 46 is less than the length of the barrel 12 disposed in the lane. A second hole pair, formed as respective holes 48, 50 are formed in the second conduit 40' and are positioned across lane F from respective holes 44, 46; i.e. directly across in the Z direction from each other. As a result holes 48, 50 are spaced from each other along second conduit 40 a distance less than the length of barrel 12. A first anchor 42 is secured near first conduit 40 adjacent hole 44. A second anchor 43 is also disposed near the other hole of the first conduit 40, so that anchors 42, 43 are adjacent the same conduit 40.

Each barrel 12 is a buoyant device, and in a preferred nonlimiting embodiment is a gas filled sealed container having a substantially oblong shaped. Each barrel 12 has at least one indentation, or a neck, 62 disposed at a position along the length and extending about the circumference.

As seen in FIG. 5 barrel 12 extends into the gap between conduits 40 of each conduit pair and comes in contact with each conduit 40 of a respective conduit pair within each respective lane, and deck board 32. As a result of the size of gap and dish H, only a portion of each barrel 12 above a central line G of barrel 12 extends within the gap H.

A strap 52 is affixed at one end to anchor 42, which in a preferred nonlimiting embodiment is a steel screw eye affixed to either one of hull frame member 34 or conduit 40 adjacent hole 44. Strap 52 traces a path from anchor 42 about barrel 12, through hole 48, across a portion of conduit 40, through hole 50, about barrel 12, through hole 46 to be anchored to second anchor 43. In a preferred nonlimiting embodiment, strap 40 extends substantially across the height, and through, each of conduits 40 as well as beneath barrel 12 as seen in FIG. 5. Tightening of strap 52 about barrel 12 secures barrel 12 within gap H to conduits 40 and deck board 32 preventing movement of barrels 12 relative to deck 18 in the Z direction and the Y direction.

In a preferred nonlimiting embodiment, strap 52 is a stainless steel wire. A tightening mechanism 64 is disposed along the path traced by strap 52 to tighten strap 52 about barrel 12. In the preferred nonlimiting embodiment, tightening mechanism 64 is a turnbuckle disposed between second anchor 43 and an end of strap 52.

The path of strap 52 extends along a portion of indent 62 (See FIG. 4) preventing movement of barrel 12 along lane E in the X direction. Lateral movement of barrels 12 within each respective lane is further prevented by a stop 38 disposed, at each end of each respective lane A-C and E-G, between the barrel 12 and frame 14. In this way, barrel 12 is anchored between a stop 38 and that portion of strap 52 engaging barrel indent 62 further preventing movement in the X direction along a respective lane.

As can be seen from FIG. 3 two or more barrels may be disposed within a respective lane as evidenced by a space 36 between a first barrel 12 and a second barrel 12'. The retaining structure 15 formed of opposed hull frame members 34, conduits 40, 40', strap 50 and associated anchors as described above is provided for each individual barrel 12 along the lane for each lane. As a result, there is a corresponding anchor 42 and an anchor 43 for each respective barrel 12 as well as an individual strap 52 extending therebetween about each barrel 12 to provide stability and prevent movement of barrel 12 within each lane. However and a single conduit 40, 40" may extend substantially the length of the lane and stop 38 is only provided at the ends of each lane. The structure is duplicated for each barrel 12 within each lane other than lane D.

As a result of structure 15, each barrel is maintained in place against, and between, respective conduit pairs preventing lateral movement. At the same time, the use of stops and the indent in respective barrels prevents longitudinal movement of the barrels providing enhanced stability to the overall structure.

Thus while there have been shown, described and pointed out novel features of the present invention as applied to preferred embodiments thereof, it will be understood that various omissions and substitutions and changes in the form of details of the disclosed invention may be made by those skilled in the art without departing from the spirit and scope of the invention. It is the intention, therefore, to be limited only as indicated by the scope of the claims appended hereto. It is also to be understood that the following claims are intended to cover all of the generic and specific features of the invention herein described and all statements of the scope of the invention, which as a matter of language, might be said to fall therebetween.

What is claimed is:

1. A structure for stabilizing a barrel on a pontoon vessel comprising:
   a deck structure;
   a first hull frame member affixed to the deck structure;
   a second hull frame member affixed to the deck structure spaced from the first hull frame member;
   a first conduit extending along the first hull frame member;
   a second conduit extending along the second hull frame member, the first conduit being spaced from the second conduit by a distance dimensioned to receive a portion of a barrel therebetween, each conduit contacting the barrel above of a central line of the barrel; and
   a strap anchored at a first end adjacent the first conduit and the strap tracing a path from the first conduit, along, beneath, and in contact with, the barrel disposed between the first conduit and the second conduit, along the second conduit, and along a return to the first conduit extending beneath, and in contact with, the barrel and being anchored at a second end adjacent the first conduit.

2. The structure for stabilizing a barrel on a pontoon vessel of claim 1 wherein the deck structure is in the shape of an octagon.

3. The structure for stabilizing a barrel on a pontoon vessel of claim 1 comprising a superstructure extending from the deck structure.

4. The structure for stabilizing a barrel on a pontoon vessel of claim 3 wherein the superstructure is in the form of a tiki hut.

5. The structure for stabilizing a barrel on a pontoon vessel of claim 1 wherein the first hull frame member and the second hull frame member form a first lane therebetween; the barrel being disposed within the lane.

6. The structure for stabilizing a barrel on a pontoon vessel of claim 1, further comprising at least a third hull frame member, the third hull frame member and the second hull frame member forming a second lane, the second lane being parallel to the first lane.

7. The structure for stabilizing a barrel on a pontoon vessel of claim 6, wherein a second barrel is received within the second lane.

8. The structure for stabilizing a barrel on a pontoon vessel of claim 6, further comprising a plurality of hull frames affixed to the deck structure; each of the plurality of hull frames being spaced from the first hull frame and each respective one of the plurality of hull frames, and each of the plurality of hull frames being substantially parallel to the first hull frame and an adjacent hull frame to form a plurality of lanes, the barrel being disposed in one of the plurality of lanes, and at least one of the plurality of lanes not having a barrel disposed therein.

9. The structure for stabilizing a barrel on a pontoon vessel of claim 8, wherein the number of the plurality of lanes is an odd number and a central lane of the plurality of lanes is the at least one of the plurality of lanes not having a barrel disposed therein.

10. The structure for stabilizing a barrel on a pontoon vessel of claim 1, wherein the deck structure further comprises a plurality of deck boards, each deck board being disposed at spaced intervals along at least one hull frame member and extending substantially orthogonal therewith.

11. The structure for stabilizing a barrel on a pontoon vessel of claim 1, further comprising a first hole formed in the conduit and a second hole formed in the conduit, the first hole being spaced from the second hole a distance less than the length of a barrel disposed along said conduit.

12. The structure for stabilizing a barrel on a pontoon vessel of claim 1, wherein the barrel has a neck formed therein, the neck receiving the strap therein.

13. The structure for stabilizing a barrel on a pontoon vessel of claim 1, wherein the strap has a first end and a second end, and the structure further comprising a first anchor and a second anchor, the first end being affixed to the first anchor, and the second end being affixed to the second anchor.

14. The structure for stabilizing a barrel on a pontoon vessel of claim 1 further comprising a tightening mechanism adjacent the strap and one of the first anchor and second anchor for tightening the strap about a barrel.

\* \* \* \* \*